United States Patent [19]
Suzuki et al.

[11] Patent Number: 6,049,875
[45] Date of Patent: Apr. 11, 2000

[54] SECURITY APPARATUS AND METHOD

[75] Inventors: Kaoru Suzuki; Kazuhiro Fukui; Hisashi Kazama; Osamu Yamaguchi; Eiji Tanaka; Yasuhiro Taniguchi, all of Tokyo, Japan

[73] Assignee: Kabushiki Kaisha Toshiba, Japan

[21] Appl. No.: 08/810,623

[22] Filed: Feb. 28, 1997

[30]     Foreign Application Priority Data

Mar. 8, 1996  [JP]  Japan ................................. P08-051973
 Sep. 13, 1996 [JP]  Japan ................................. P08-243879

[51] Int. Cl.[7] ....................................................... G06F 12/14
[52] U.S. Cl. ................................. 713/200; 713/201; 380/5
[58] Field of Search ............................... 395/186, 187.01, 395/188.01, 200.46, 200.47; 380/4, 23, 25; 364/222.5, 286.4, 286.5, 260.81

[56]               References Cited

U.S. PATENT DOCUMENTS 5,182,770  1/1993  Medveczky et al. ........................ 380/4
5,414,852  5/1995  Kramer et al. ............................ 395/700
5,550,968  8/1996  Miller et al. ............................. 345/332
5,560,008  9/1996  Johnson et al. .......................... 395/650
5,715,417  2/1998  Gardien et al. .......................... 345/352

*Primary Examiner*—Dieu-Minh T. Le
*Attorney, Agent, or Firm*—Graham & James LLP

[57]             ABSTRACT

A security apparatus. A service is supplied to a user while maintaining the security of the service. A person discrimination section discriminates the user to be supplied the service. A user situation decision section decides whether the user is under a situation to use the service. An infringement situation decision section detects whether a non-user intrudes into a use area of the service in order to decide whether the security of the service is infringed. A service control section supplies the service to the user in case the person discrimination section discriminates the user, and controls a supply of the service if the use situation decision section decides the user is not under the situation to use the service or the infringement situation decision section decides that the security of the service is infringed.

16 Claims, 17 Drawing Sheets

SECURITY APPARATUS AND METHOD

BACKGROUND OF THE INVENTION

1. Field of the Invention

The present invention relates to a security apparatus and a method for supplying a service to a user by confirming a use situation of the user and infringement situation of non-user in order to keep safety and reliability for the service.

2. Description of the Related Art

A method to specify the user in service-use area by electrical means and to execute security for each kind of service is very important in present electrical society. Various kinds of security means, for example, memorized number, magnetic card, IC card, wireless card, sound comparison, fingerprint comparison, retina comparison and face comparison, have been used. However, the memorized number, the magnetic card, the IC card and the wireless card specifies the user by information only the user knows or with a memory device key for only the user. Therefore, they are in danger of being used unjustly.

On the other hand, sound comparison, fingerprint comparison, retina comparison, and face comparison are effective personal confirmation means to defect an other's unjust use because the user's physical features are used as a key. However, the personal confirmation is only used at the begining of service. After the service begins, the service can not be interrupted. Therfore, even if an other person changes for the user after the service is begun, the service can not be interrupted. In short, this kind of service includes danger that the other person utilizes the service unjusty. This kind of problem is included in the memorized number, the magnetic card, the IC card and the wireless card.

As mentiored above, the known security apparatuses include following problems.

(1) After security is cancelled by confirming the user, security function is not executed while supplying the service. Therefore, even if an other person changes for the user, the service is still supplied continuously.

(2) While supplying the service to the user, it often happens that an other person watches information not to be disclosed on display from behind the user. This problem occurs because security is not provided in the physical space surrounding the user and the apparatus even if security is executed inside the apparatus electrically. Especially, this problem happens when the service is supplied to the user in public place in which other persons are not excluded.

SUMMARY OF THE INVENTION

It is an object of the present invention to provide a security apparatus and method to supply a service to the user while safety and reliability for the service are kept.

According to the present invention, there is provided a security apparatus for a device supplying a service to a user, comprising: person discrimination means for recognizing a user requesting the service; use situation decision means for deciding whether the user is under a situation to use the service; infringement situation decision means for detecting whether a non-user intrudes into a use area the service to decide whether of the service is infringed; service control means for supplying the service to the user in case said person discrimination means recognizes the user, and for controlling a supply of the service if said use situation decision means decides the user is not under the situation to use the service or if said infringement situation decision means decides that the security of the service is infringed.

Further in accordance with the present invention, there is provided a security method associated with supplying a service to a user, comprising the step of: recognizing a user desiring the service: supplying the service to the user if the user is recognized; deciding whether the user is under a situation to use the service; deciding whether a non-user intrudes into a use area of the service; and controlling the supply of the service if the user is not under the situation to use the service or if the non-user is intruding into the use area of the service.

Further in accordance with the present invention, there is also provided a computer readable memory containing computer-readable instructions to supply a service to a user, comprising: instruction means for causing a computer to recognize a user desiring the service; instruction means for causing a computer to supply the service to the user if the user is recognized; instruction means for causing a computer to decide whether the user is under a situation to use the service; instruction means for causing a computer to decide whether a non-user intrudes into a use area of the service; and instruction means for causing a computer to control a supply of the service if the user is decided not under the situation to use the service or the non-user is decided to intrude into the use area of the service.

DETAILED DESCRIPTION OF THE PREFERRED EMBODIMENTS

Figure 1:
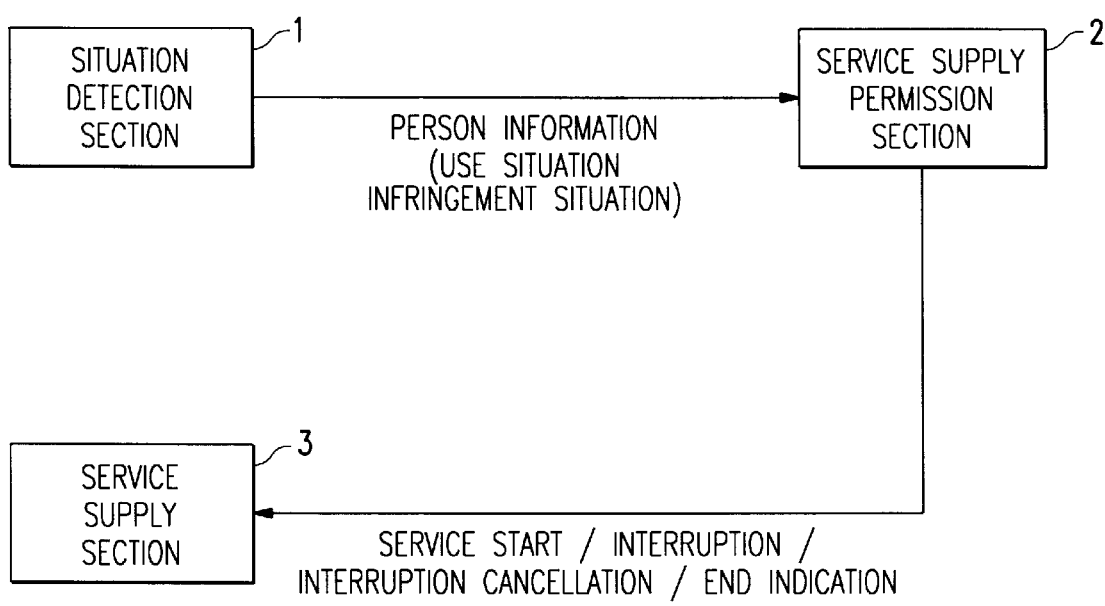
FIG. 1 is a block diagram of the security apparatus according to the present invention.

The embodiments of the present invention are described below with reference to the drawings. FIG. 1 is a block diagram of the security apparatus according to the present invention. The security apparatus of the present invention is comprised of a situation detection section 1, a service supply permission section 2 and a service supply section 3. The situation detection section 1 discriminates the user in service-use area, detects whether the user is under a situation to use the service (use situation) and detects whether a non-user infringes the security of the user (infringement situation). The detection result of the use situation and the infringement situation is outputted to the service supply permission section 2 as person information. In this place, the situation that the user can utilize the service represents that the user is confirmed to be permitted the supply of the service and the user continuously utilizes the service. A situation that the user continuously utilizes the service represents a status that the user actually interacts with the service application (the user inputs operation to system or the user is supplied output from the system). A status of non-interaction within predetermined time indicates thinking, chattering, looking away. Another status indicates when the user moves away from service use-space within a predetermined time.

The situation that a non-user infringes the security of the user represents that a person other than the confirmed user intentionally or accidentally uses the service while the service is supplied to the confirmed user. The other person can then interact with the operation or information to be disclosed only to the confirmed user. When the user interacts with the service application of the system through a display, the other person looks on the display behind the user. Otherwise, the other person intends to interact with the service application in the user's absence within the predetermined time.

In order to detect each situation, the situation detection section 1 monitors service-use area using image or sound. Especially, the use situation of the user and the infringement situation of the security are detected by the image (person detection/direction of face detection/person confirmation) and the sound (person detection/person specification/chattering detection). Monitoring may be wireless.

The service supply permission section 2 controls start/interruption/interruption and cancellation/end of the service for the service supply section 3 according to the detection result of the situation detection section 1. In this case, the service supply permission section 2 starts the supply of the service when the user is specified in the service-use area. The service supply permission section 2 controls the supply of the service in at least one of the cases where the user does not utilize the service or where the security of the user is infringed. Especially when the user does not utilize the service during the supply of the service, the supply of the service finishes. If the security of the user is infringed by another person, the supply of the service interupts until the infringement is relieved. The service supply section 3 supplies various kinds of service under the control of the service supply permission section 2. For example, an uninhabited ATM (antomatic teller's machine), a portable terminal, or a computer used by several persons may comprise the service supply section 3.

Figure 2:
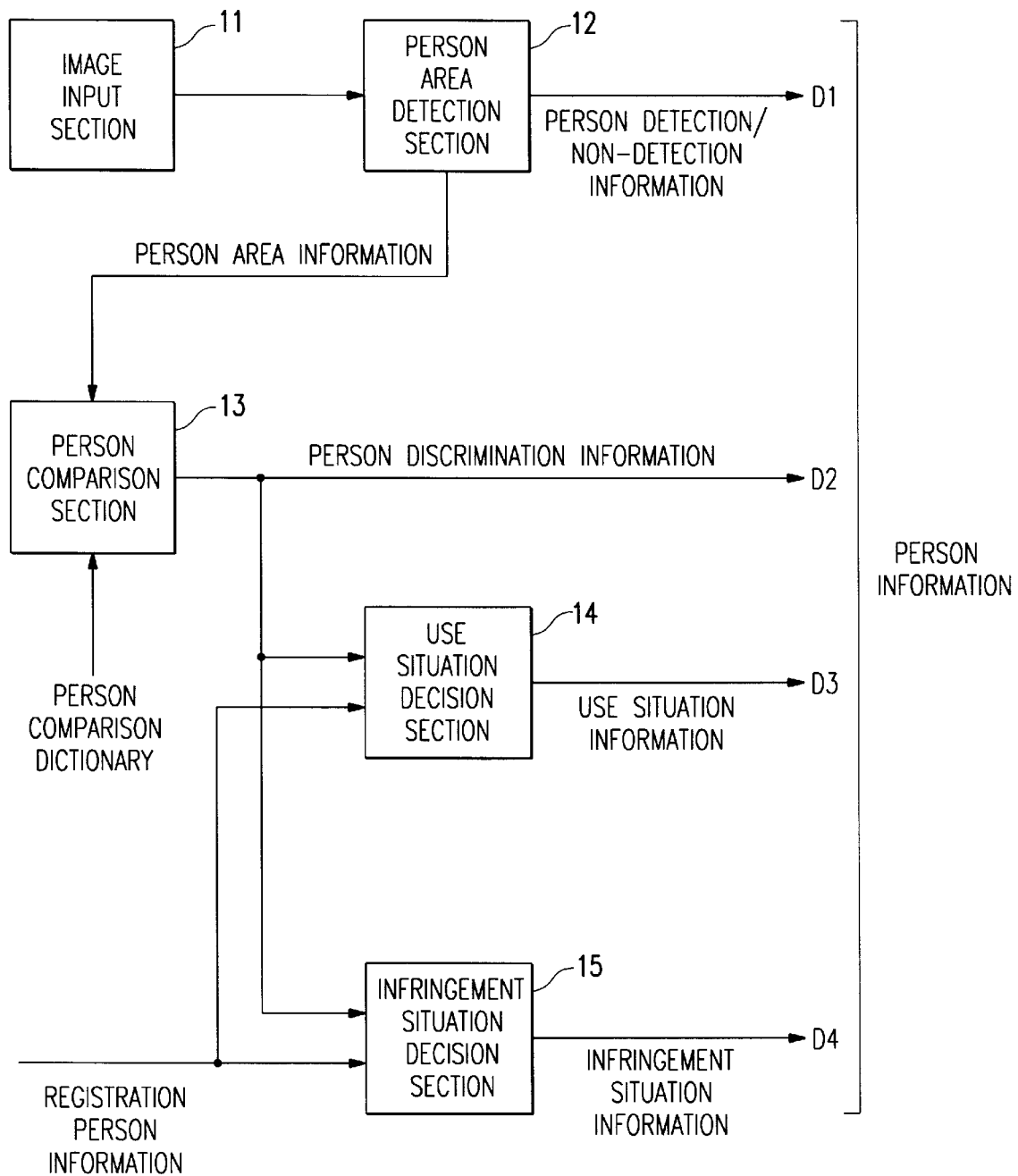
FIG. 2 is a block diagram of the situation detection section of the security apparatus according to the present invention.

FIG. 2 is a block diagram of the situation detection section 1. In this case, an image is used as a way to discriminate the user, detecting the use situation, or detect an infringement situation. The situation detection section 1 is comprised of an image input section 11, a person area detection section 12, a person comparison section 13, a use situation decision section 14 and an infringement situation decision section 15. The image imput section 11 inputs an image through a TV camera. The TV camera is set in the service use area for continuously observing the user to be supplied the service. The person area detection section 12 analyzes images input by the image input section 11 and monitors the secure area from the input image. For example, a difference between the input image and background image (uninhabited area) indicates a person present in the secure area. The person area detection section 12 outputs person detection information D1 when the person present is detected and outputs non-detection information D1 when the person present is not detected.

The person comparison section 13 compares the person present area image with the content of a person comparison dictionary to specify which person is present in the secure area image. The person comparison dictionary previously stores at least comparison information of persons permitted to use the service. The person comparison section 13 outputs person discrimination information D2 representing whether the person present coincides with a person permitted to use the service. If the person present coincides with a person permitted to use the service in the person comparison dictionary, the person present is registered as the user who can be supplied the service.

The use situation decision section 14 detects whether the user is under a situation capable of using the service. After the user of the person area is registered and if the registered user is now included in the person discrimination information D2, the user is decided to be capable of using the service. The use situation decison section 14 outputs use situation information D3 representing whether the user is capable of using the service.

The infringement situation decision section 15 detects whether a non-user infringes the security of the service. If a person other than the user utilizing the service now is included in the person discrimination information D2, the infringement situation decision section 15 decides that the security of the service is infringed, and outputs infringement situation information D4 indicates a breach of security. The person detection/non-detection information D1, the person discrimination information D2, the use situation information D3, the infringement situation information D4 are called person information. The person information is read out by the service supply permission section 2 (step S1 in FIG. 3 explained afterward) and referred at steps S3, S4, S8, S11 in FIG. 3.

Figure 3:
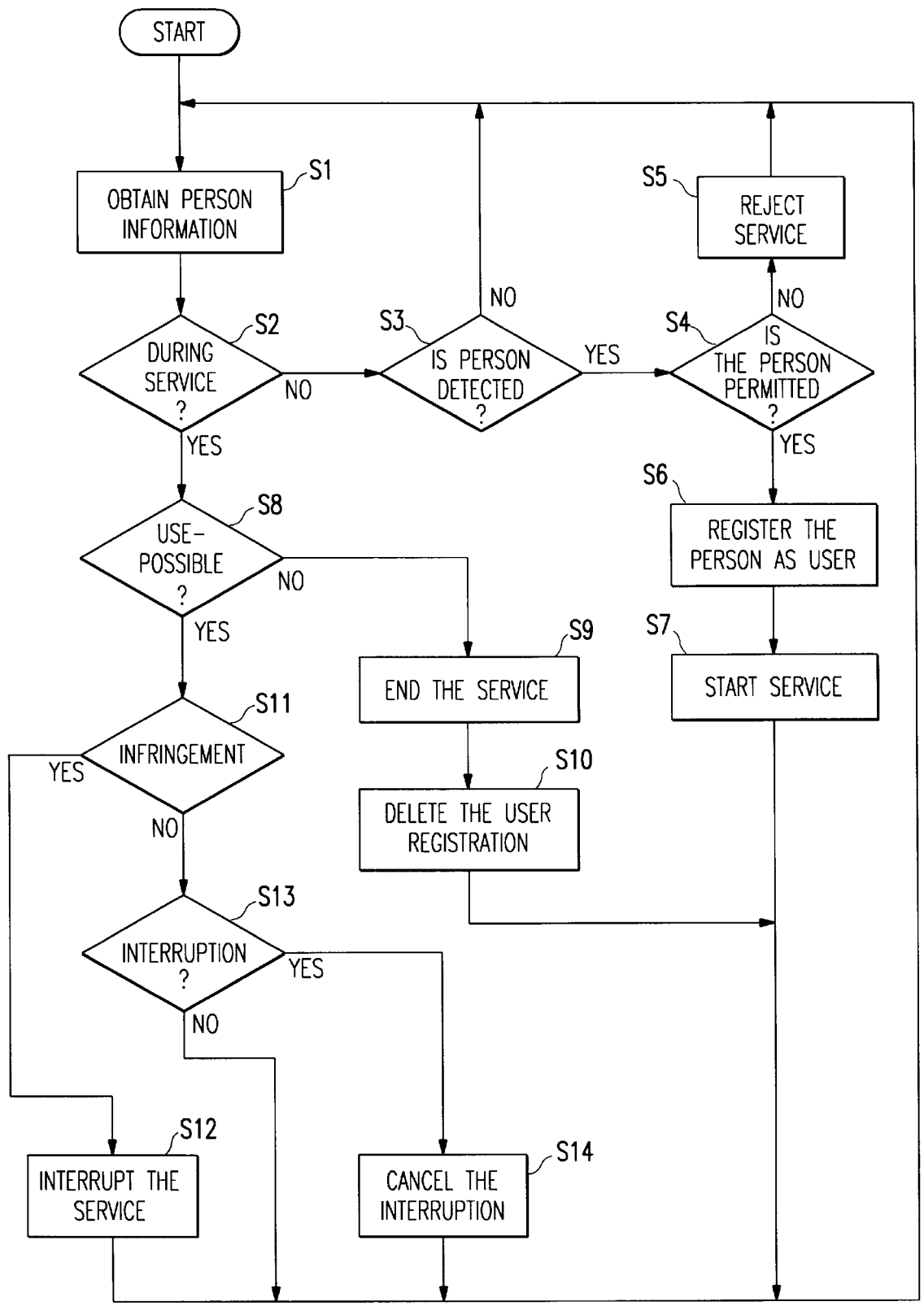
FIG. 3 is a flow chart of processing of a service supply permission section according to a first embodiment of the present invention.

FIG. 3 is a flow chart of processing of the service supply permission section 2. As mentioned above, the situation detection section 1 discriminates the user in the service-use area and monitors the use situation and the infringement situation using the image inputted from the TV camera. The person information as detection result of the situation detection section 1 is outputted to the service supply permission section 2. By using the person information, the service supply permission section 2 executes a security controlling process to the service supply section 3. First, the service supply permission section 2 obtains the person information from the situation detection section 1 (step S1). When the supply of the service begins ("No" at step S2), the service supply permission section 2 monitors the security area in the service use area according to the person detection/non-detection information D1 (step S3). If a person area is not detected ("No" at step S3), processing of the service supply permission section 2 is returned to step S1. On the other hand, if a person is detected ("Yes" at step S3), the service supply premission section 2 decides whether the person is permitted as a user (step S4). As a result, in case the person is not permitted as a user ("No" at step S4), the service supply permission section 2 rejects the supply of the service (step S5) and returns processing to step S1. In case the person is permitted as a user ("Yes" at step S4), the service supply permission section 2 registers the person as the user (step S6). After that, the use situation of the person is continuously monitored. The service supply permission section 2 begins the supply of the service (step S7) and returns the processing to S1.

The above process steps (step S1~S7) are the same as normal confirmation of security (from confirming the user to begining the supply of the service). In this place, after the supply of the service is begun, the registered user exists in the service-use area and the registered person must be detected at step S1. After the supply of the service is begun, the processing is returned to step S8 through steps S1 and S2.

The service supply permission section 2 decides whether the registered person is using the service according to the use situation information D3 (step S8). As a result, if the situation of using the service is detected, for example, a user's absence continues above a predetermined time ("No" at step S8), the service supply permission section 2 terminates the supply of the service immediately (step S9). Next, the registration of the user is cancelled (step S10) and the processing returns to step S1 in order to register a new user.

On the other hand, the service supply permission section 2 decides whether a non-user infringes the security of the user according to the infringement situation information D4 (step S11). As a result, if the situation that a non-user infringes the security is detected, for example, an other person watches the display behind the user during the supply of the service ("Yes" at step S11), the service supply permission section 2 temporarily interrupts the service to maintain security untill the security is not infringed (step S12). If a situation that the security is not infringed is detected during the interruption of the service ("Yes" at step S13), the service supply permission section 2 cancels the interruption of the service and begins the supply of the service (step S14).

In this way, in case the user permitted the service is specified in the service use area, the supply of the service is begun. During the supply of the service, if the user is not using the service or if the security is breached, the supply of the service finishes or interrupts. Accordingly, the security is maintained during all periods of begining/supplying/end of the service. For example, in case the registered user is confirmed and supplied money through an Automatic Teller Machine, or the user operates a handy terminal by watching secret information on a display, the security of the user is effectively protected according to the present invention.

Next, additional embodiments of the present invention will be explained.

(a) ease of monopoly of terminal/improvement of common use of terminal (second embodiment)

In the first embodiment, another person can not use the terminal while the user is supplied the service through the terminal. Therefore, the other person must wait to use the same terminal untill the first user finishes. In short, in the first embodiment, use by a specified user for the terminal excludes use by an other person.

In a second embodiment, in case the situation for the user not capable of using the service is detected before the supply of the service for the user finishes, the supply of the service is reserved (interrupted) and the new user can be supplied the service from the begining. As a result, during the interruption of the service, a different service is supplied to another user. When the original user comes back to the terminal, the reserved service is supplied to the original user again. Therefore, while each service is not completed respectively, plural users can be supplied each service from the same terminal one after another. Additionally, if the original user does not come back to the same terminal, the reserved service is finished and memory area corresponding to the reserved service is relieved to save memory resources.

Figure 4:
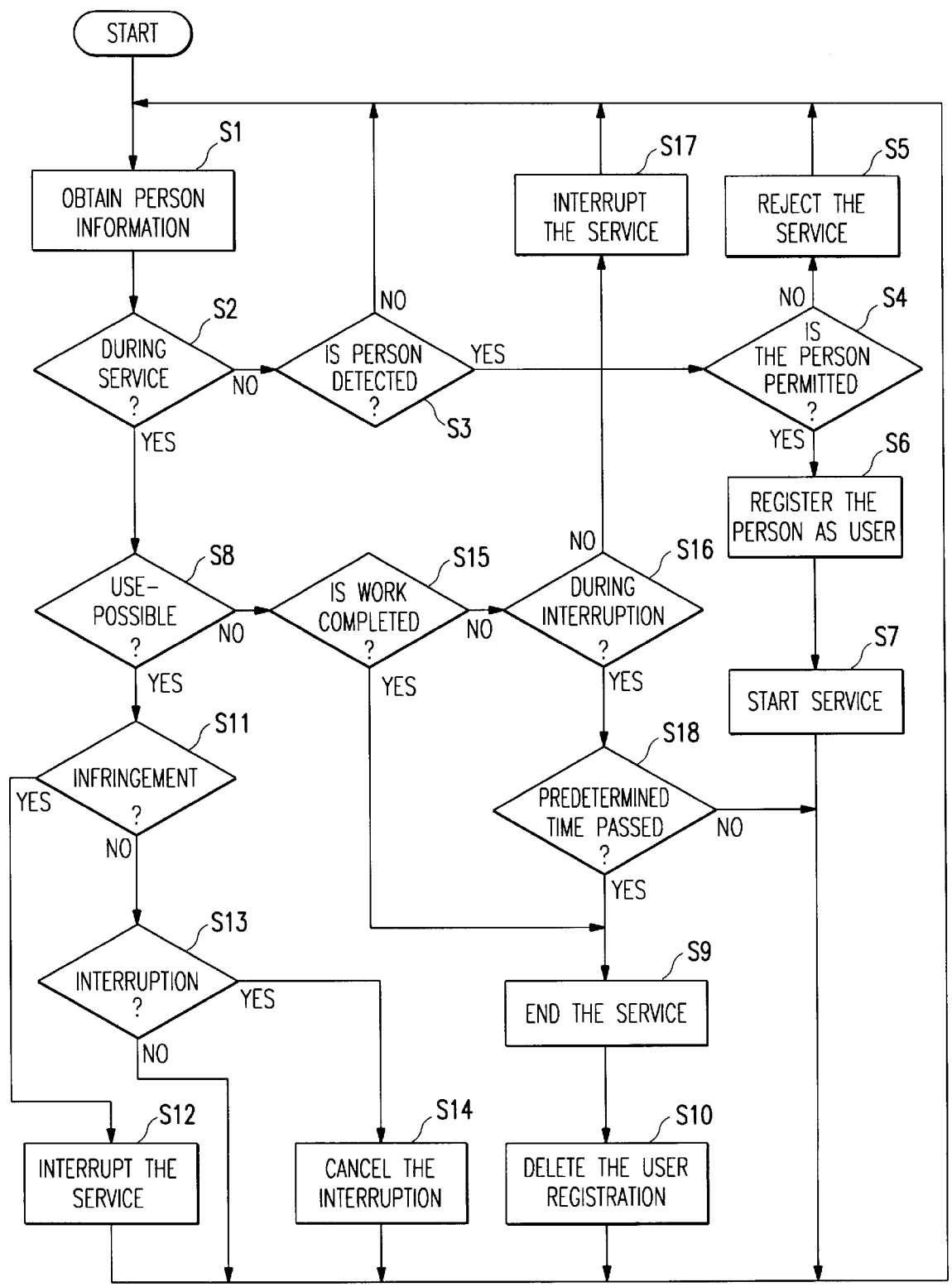
FIG. 4 is a flow chart of processing of the service supply permission section according to a second embodiment of the present invention.

FIG. 4 is a flow chart of processing of the service supply permission section according to the second embodiment. In this case, assume that a computer network is commonly used by plural users and a plurality of terminals connected to the network provide a security function. In FIG. 4, steps S15, S16, S17, S18 are newly added in comparison with FIG. 3. Each user is confirmed respectively and supplied the service through a respective terminal (step S1, S2).

In this place, assume that a user A creates a document using a terminal A and leaves from the terminal A without completing the work. The terminal A detects that the user A is not using the service ("No" at step S8) and that the supply of the service is not completed ("No" at step S15). The service of creating the document at the present time is stored (reserved) in a memory area of the terminal and the supply of the teminal is interrupted (step S16, S17). In this case, the situation for the user not using the service is detected according to the use situation information D3. Completion situation of the supply of the service is decided by completion notice sent by the user. Next, a user B is confirmed by the teminal A and works through the terminal A. Assume that when the user A comes back to the terminal A, the user B goes away from the terminal A. The terminal A newly reserves the results of the service for the user B (steps S8, S15, S16, S17) and begins the supply of the reserved service to the user A (steps S8, S11, S13, S14). The memory area to store the result of the service is commonly used by each terminal on the network. Therefore, if the user B is confirmed by a terminal B (steps S4, S6, S7), the reserved result of the service for the user B is supplied through the terminal B (steps S8, S11, S13, S14). On the other hand, if the user A does not come back to the terminal A during a predetermined time ("Yes" at step S18), the terminal A finishes the service of the user A immediately and relieves the memory area corresponding to the service result of the user A (steps S9, S10). In this way, a situation of storing many service results in memory area is prevented. The predetermined time as decison standard at step S18 is freely set by the kind of the service.

As mentioned above, in the second embodiment, the supply of the service for each user is reserved untill the work of each user is completed. In short, a right service-use generated by confirming the user is assured untill the user's work is completed. The user B does not have to wait untill the user A finishes using the terminal. By changing the user A for the user B, the user B can use the terminal without infringement for the security of the user A.

(b) Extention for unspecified user (third embodiment)

In the first embodiment, in order to be supplied the service, the user must be confirmed as a registered person. In short, if the user is not previously registered, he can not be supplied the service. However, there is a service to be used by many and unspecified persons. Therefore, in a third embodiment, the service is supplied to an unspecified person without confirmation. At that time, a comparison dictionary of the unspecified person is generated and registered. During the supply of the service, the user (the unspecified person) is discriminated from other users by referring to the comparison dictionary. Therefore, the service is supplied to many and unspecified persons while the security is maintained.

Figure 5:
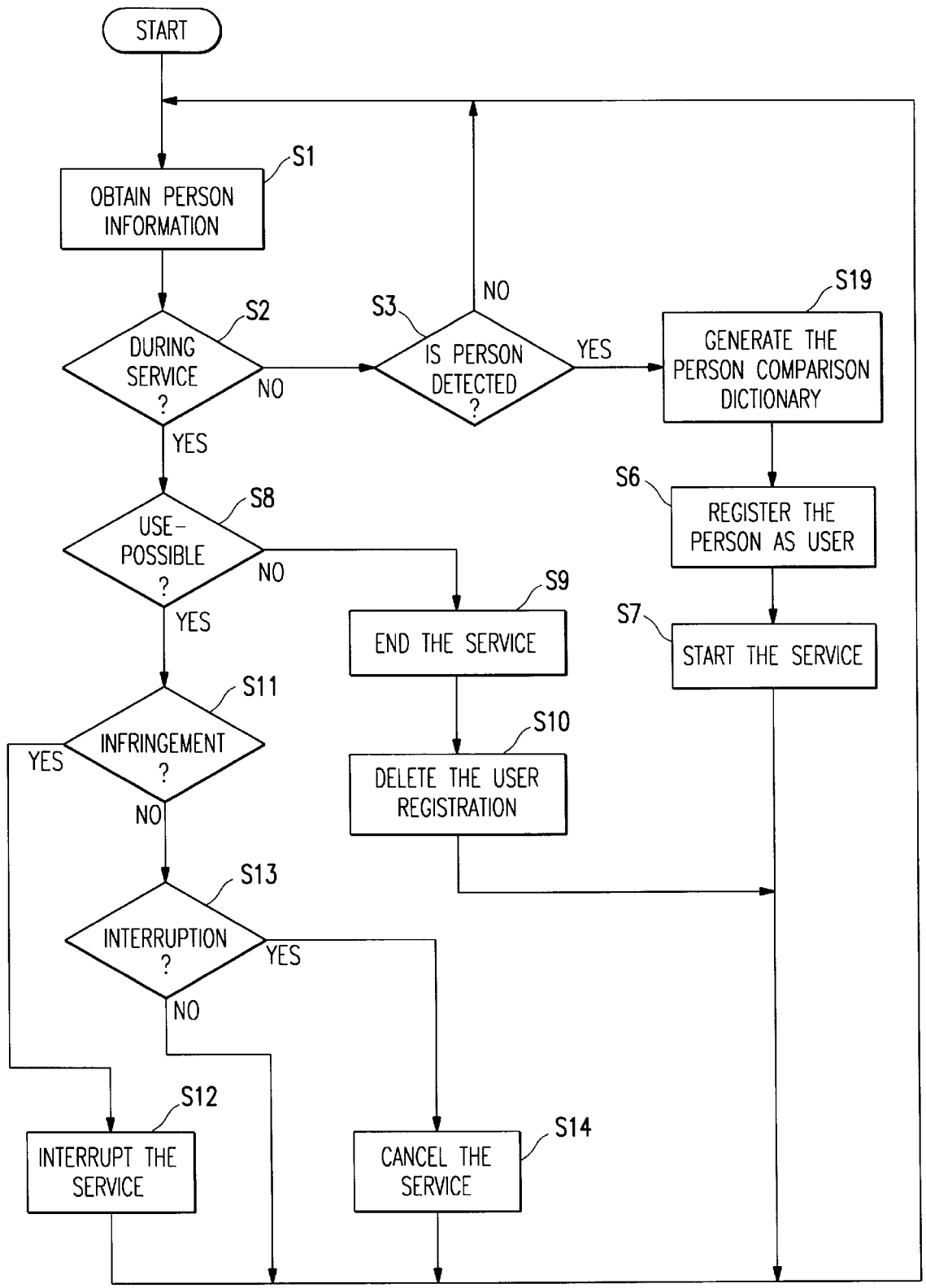
FIG. 5 is a flow chart of processing of the service supply permission section according to a third embodiment of the present invention.

FIG. 5 is a flow chart of processing of the service supply permission section 2 according to the third embodiment. In FIG. 5, step S19 is newly added instead of steps S4, S5 in comparison with FIG. 3. When the supply of the service is begun ("No" at step S2), the service supply permission section 2 detects the person in the service use area according to the person detection/non-detection information D1 (step S3). If the person is detected ("Yes" at step S3), the service supply permission section 2 generates the person comparison dictionary (step S19) and registers the person as a new user (step S6). After that, the use situation of the new user is continuously monitored, and the service supply permission section 2 begins to supply the service (step S7). In this way, the service is supplied to an unspecified person without confirmation and the person comparison dictionary is generated to be registered. Therefore, a new user except for the pre-registered user is able to be supplied the service. In this case, during the supply of the service for the new user, he is discriminated from another person by referring the person comparison dictionary in order to maintain the security.

(c) Warning of infringement (fourth embodiment)

In the fourth embodiment, when an infringement situation of the security is detected, a warning is sent to the user. In this case, the service supply permission section 2 controlls the begining and end of the service and does not execute interruption and cancellation of the service in case of infringement of the security.

Figure 6:
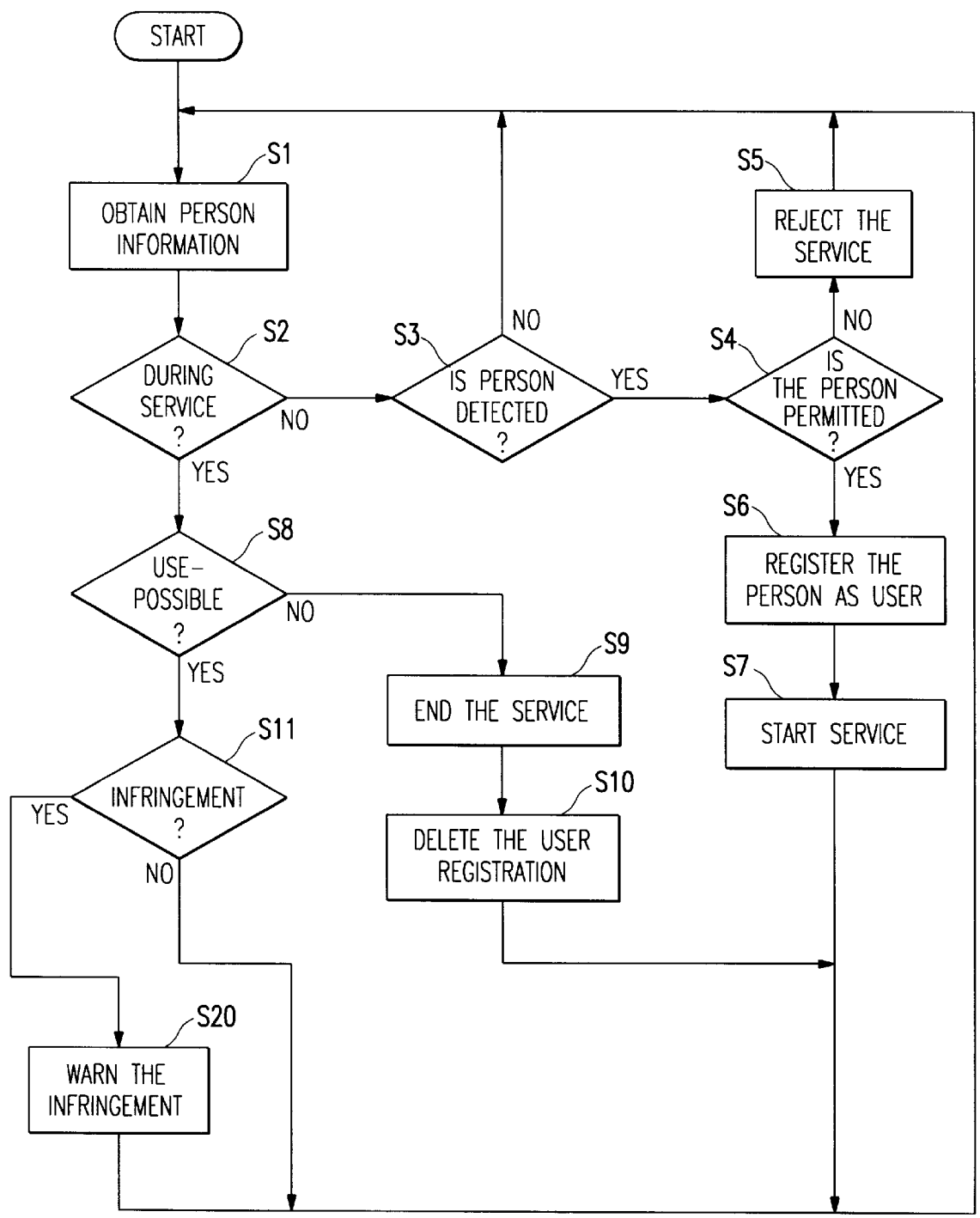
FIG. 6 is a flow chart of processing of the service supply permission section according to a fourth embodiment of the present invention.

FIG. 6 is a flow chart of processing of the service supply permission section 2 according to the fourth embodiment. In FIG. 6, step S20 is a newly added step instead of step S12 in comparison with FIG. 3. First, when the situation detection section 1 detects the infringement situation of non-user ("Yes" at step S11), the service supply permission section 2 sends a warning of the infringement to the user (step S20). Concretely speaking, the warning is outputted through an image (warning sentence/mark, controlling of color/brightness/blink) or sound (speaking of warning sentence/warning buzzer). When the user receives the warning, it is possible for the user to protect his security by, for example, turning off a power supply of the terminal or hiding a display of the terminal.

(d) Interactive controlling in case of warning (fifth embodiment)

Figure 7:
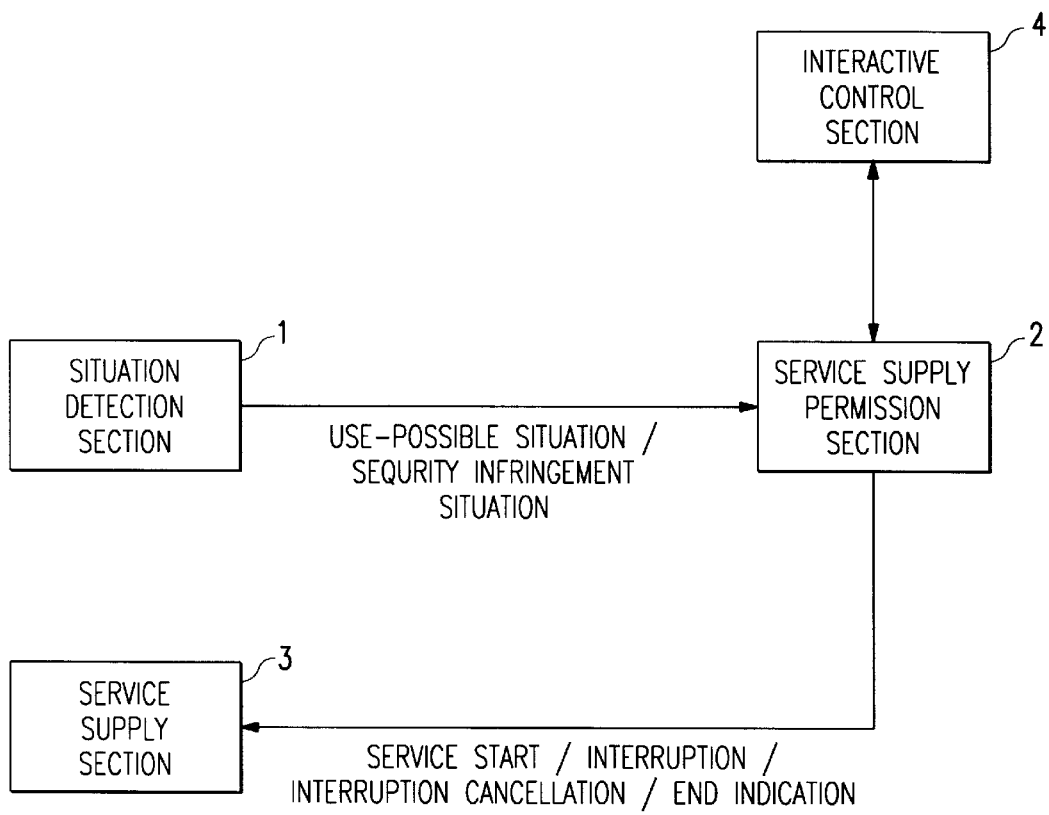
FIG. 7 is a block diagram of the sequrity apparatus according to a fifth embodiment of the present invention.
Figure 8:
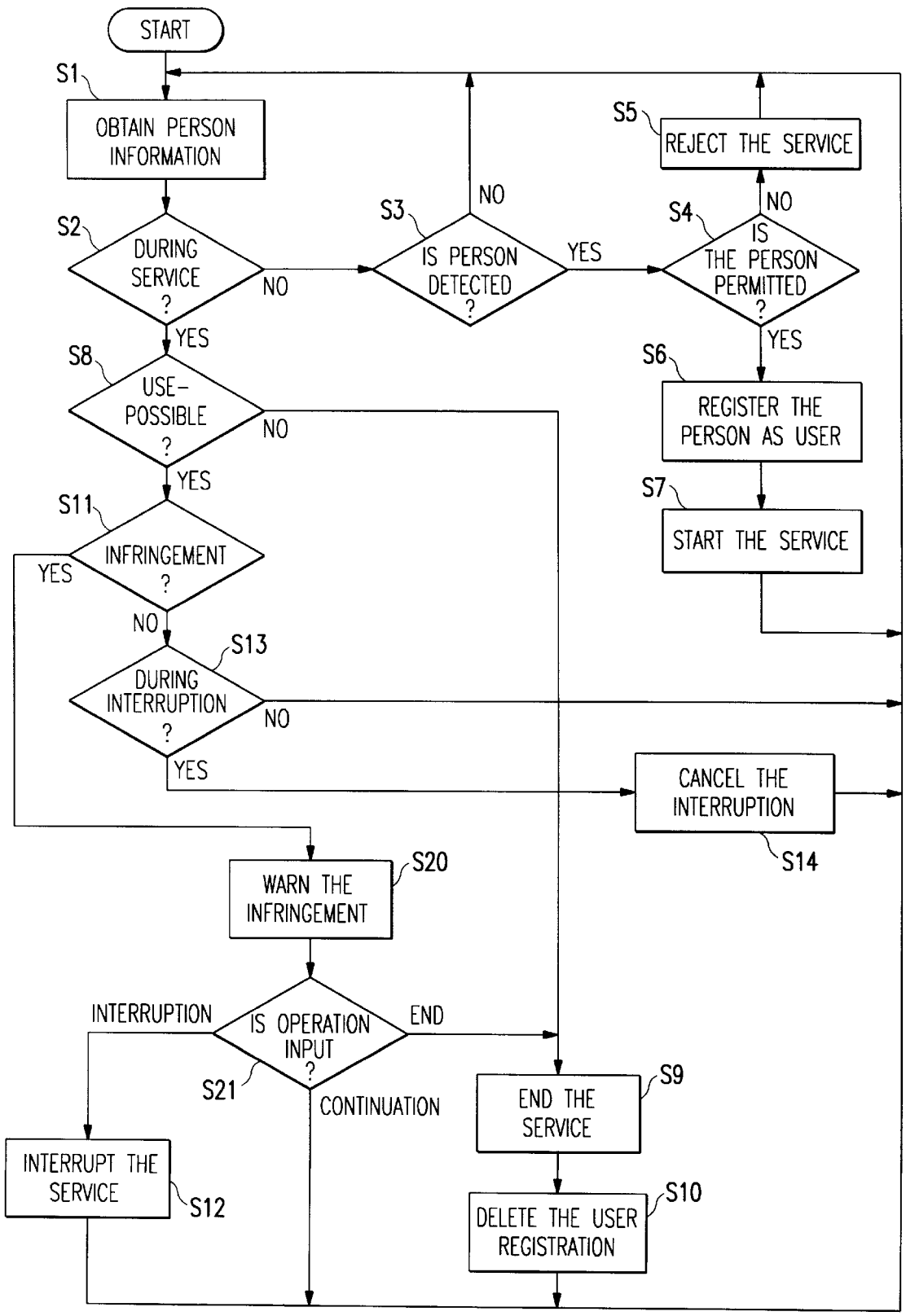
FIG. 8 is a flow chart of processing of the service supply permission section according to the fifth embodiment of the present invention.

In the fifth embodiment, by using input means (key board) and output means (display), the supply of the service is controlled by the user's operation for the warning. FIG. 7 is a block diagram of the security apparatus according to the fifth embodiment. In FIG. 7, an interactive control section 4 is a new section in comparison with FIG. 1. FIG. 8 is a flow chart of processing of the service supply permission section 2 according to the fifth embodiment. In FIG. 8, steps S20, S21 are new added steps in comparison with FIG. 3.

The interactive control section 4 receives an indication of the user for the warning of the infringement and controlls the supply of the service according to the indication. The kind of the indication is continuation/interruption/end of the service. The user selects the kind of the indication by, for example, using a keyboard. In FIG. 8, during the supply of the service, if the situation detection section 1 detects infringement by a non-user ("Yes" at step S11), the service supply permission section 2 sends the warning to the user (step S20). After sending the warning, the interactive control section 4 receives an indication of the user (step S21), the service supply permission section 2 controlls the supply of the service according to the indication.

If the user indicates continuation of the service ("CONTINUATION" at step S21), the interactive control section 4 outputs the indication of continuation to the service supply permission section 2. The service supply section 3 continues to supply the service according to the indication of continuation.

If the user indicates interruption of the service ("INTERRUPTION" at step S21), the interactive control section 4 outputs the indication of interruption to the service supply permission section 2. The service supply section 3 interrupts the supply of the service according to the indication of the interruption.

If the user indicates end of the service ("END" at step S21), the interrractive control section 4 outputs the indication of end to the service supply permission section 2. The service supply section 3 finishes the supply of the service.

In this way, when the user receives the warning of infringement, the user can select continuation/interruption/end of service by using interactive function. As a result, if the user works through equipment in an office, whenever an office colleague (person not necessary for security) stands behind the user, interruption of the work is excluded. In short, a change for the worse of use-feeling of the equipment is avoided. Otherwise, when using the equipment in a public place, interruption of the service is indicated by the user for the warning of a non-user standing behind the user.

In the fifth embodiment, the user can select the indication to keep security in case of infringement of the security. After selecting the indication, the apparatus (equipment) can automatically keep the security of the user. In this case, if the warning of the infringement is outputted as an image, the user understands circumstances around the user by watching the image (the user and non-user are included). The user can select the indication (continuation/interruption/end of the service) according to the circumstances.

(e) Default action of neglecting the warning (sixth embodiment)

In the sixth embodiment, in case the indication is not selected by the user within predetermined time after generating the warning, the apparatus automatically executes predetermined (default) controlling of the supply of the service. This predetermined controlling is freely set by the user.

Figure 9:
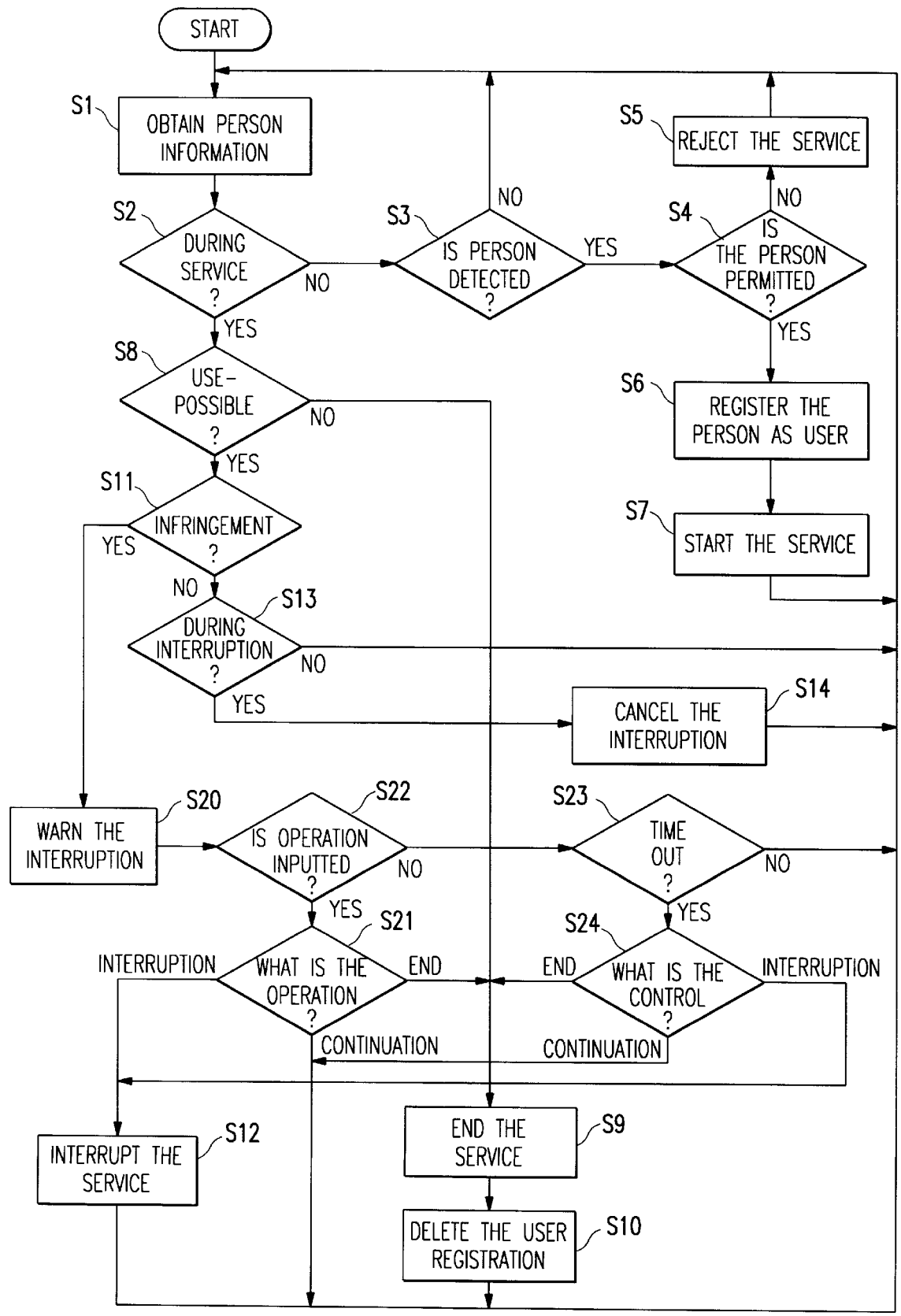
FIG. 9 is a flow chart of processing of the service supply permission section according to a sixth embodiment of the pressent invention.

FIG. 9 is a flow chart of processing of the service supply permission section 2. In FIG. 9, steps S20,S21,S22,S23,S24 are added steps in comparison with FIG. 3. The construction of the security apparatus of the fifth embodiment is the same as in FIG. 7. In FIG. 9, during the supply of the service, if the situation detection section 1 detects an infringement situation ("Yes" at step S11), the service supply permission section 2 sends the warning to the user (step S20). After the warning, the interactive control section 4 receives indication of the user. In this case, if no indication of the user is received above predetermined time (step S22, S23), the interactive control section 4 outputs the purport of no indication to the service supply permission section 2. The service supply permission section 2 controls the supply of the service according to a predetermined control (step S24). For example, if continuation of the service is set as the predetermined control ("CONTINUATION" at step S24), the service supply section 3 continues to supply the service. If interruption of the service is set as the predetermined control ("INTERRUPTION" at step S24), the service supply section 3 interrupts the supply of the service. If end of the service is set as the predetermined controlling ("END" at step S24), the service supply section 3 finishes the supply of the service. On the other hand, if the indication of the user is received within the predetermined time ("Yes" at step S22), the interactive control section 4 receives the indication (step S21) and the service supply permission section 2 controls the supply of the service according to the indication. In this case, if the user indicates continuation of the service ("CONTINUATION" at step S21), the interactive control section 4 outputs the continuation indication to the service supply permission section 2. The service supply section 3 continues to supply the service. If the user indicates interruption of the service ("INTERRUPTION" at step S21), the interactive control section 4 outputs the interruption indication to the service supply permission section 2. The service supply section 3 interrupts the supply of the service. If the user indicates end of the service ("END" at step S21), the interactive control section 4 outputs the end indication to the service supply permission section 2. The service supply section 3 finishes the supply of the service.

In this way, if the user neglects a warning of infringement, the security of the user is kept according to a predetermined control (action of default). Otherwise, it is possible to control the supply of the service different form the predetermined control for some reasons by a user's indication in case of the warning. For example, in an office, as for the warning generated whenever a colleague stands behind the user operating the equipment, the user does not have to indicate continuation of the service. The predetermined control is already set as continuation of the service. In this case, the user can continue the operation while neglecting the warning. In case the user operates the equipment in a public place, the predetermined control is set as interruption of the service. In this case, security of the user for the equipment is protected while he neglects the warning.

(f) Security degree by unit of service/information (seventh embodiment)

In the above embodiments, predetermined security is activated for service or information. However, security degree is actually different by unit of service/information. If a fixed security degree is activated, useless interruption of the service is often executed. This happens in case of plural workers using information equipment. Accordingly, it is desired that the security is activated according to the kind of the service/information. For example, assume that electric mail is transmitted using a PC (personal computer) or a document is created using WP (word processor). Plural services are then supplied on the display of the equipment. The electric mail represents a private letter and its security degree is high. On the other hand, the security degree of the document by WP differs according to the kind of the document. While the user creates the document whose security degree is low, the security degree of the document grows by adding another important document. In this way, the security degree is dynamically changed according to the kind of the service/information.

Figure 10:
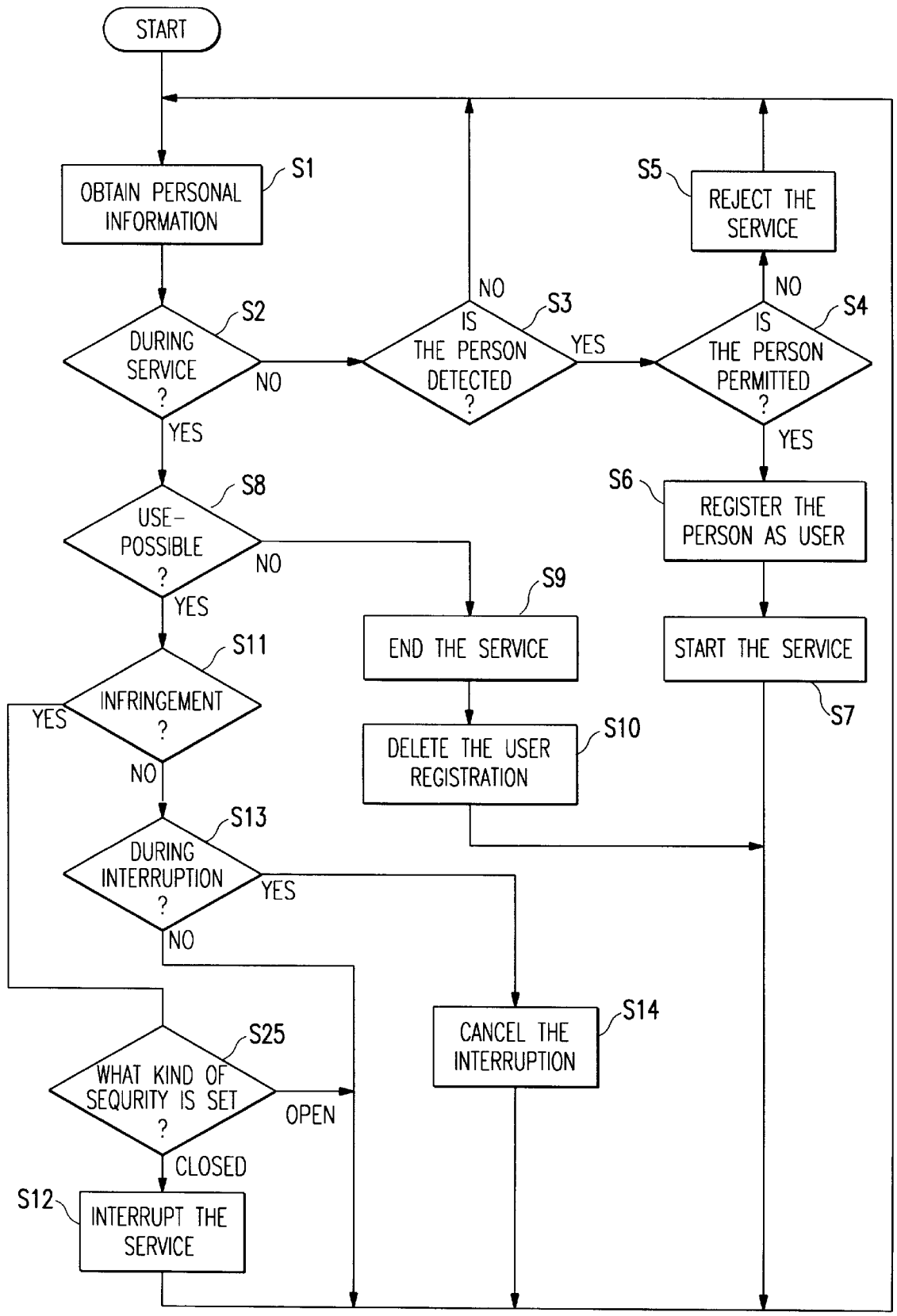
FIG. 10 is a flow chart of processing of the service supply permission section according to a seventh embodiment of the present invention.

In the seventh embodiment, the security degree is changed by unit of the service/information. FIG. 10 is a flow chart of processing of the service supply permission section 2 according to the seventh embodiment. In FIG. 10, step S25 added between S11 and S12 is a different step in comparison with FIG. 3. During the supply of the service, if the situation detection section 2 detects infringement of the security ("Yes" at step S11), the service supply permission section 2 controls the supply of the service according to the security degree set by the kind of service/information (step S25). In this case, it may be possible that the security degree is set to a mail tool to display the mail but not set to a WP tool. For example, when another person watches the display behind the user, the mail tool is only interrupted (the mail window is closed) and the WP window is continuously opened.

As for setting the security degree, for example, the user sets disclosure-possible at the head portion of mail to be sent. A window showing the mail tool does not react to the infringement of the security. As for both sending side or receiving side, the mail is able to remain disclosing.

If the user indicates a strict secret at the header of a document, the WP window to display the document reacts to the infringement of security. For example, the sequrity degree for creating the document is dynamically changed by adding other important document. In this way, even if the service is supplied to the same object, the supply of the service is interrupted or continued according to the content (for example, regular document or strict secret document).

(g) detection of visual line 1 (eighth embodiment)

In the above embodiments, when another person watches the display behind the user creating a document, the infringement of security of the user is detected. However, it is not necessary to pay attention to the other person, but to pay attention to the visual line (or line of sight) of the user. For example, when the visual line of the user leaves the screen of the display, the window may be closed. In the eighth embodiment, by detecting a visual line of the user as use situation, the supply of the service is interrupted when the visual line leaves the screen.

Figure 11:
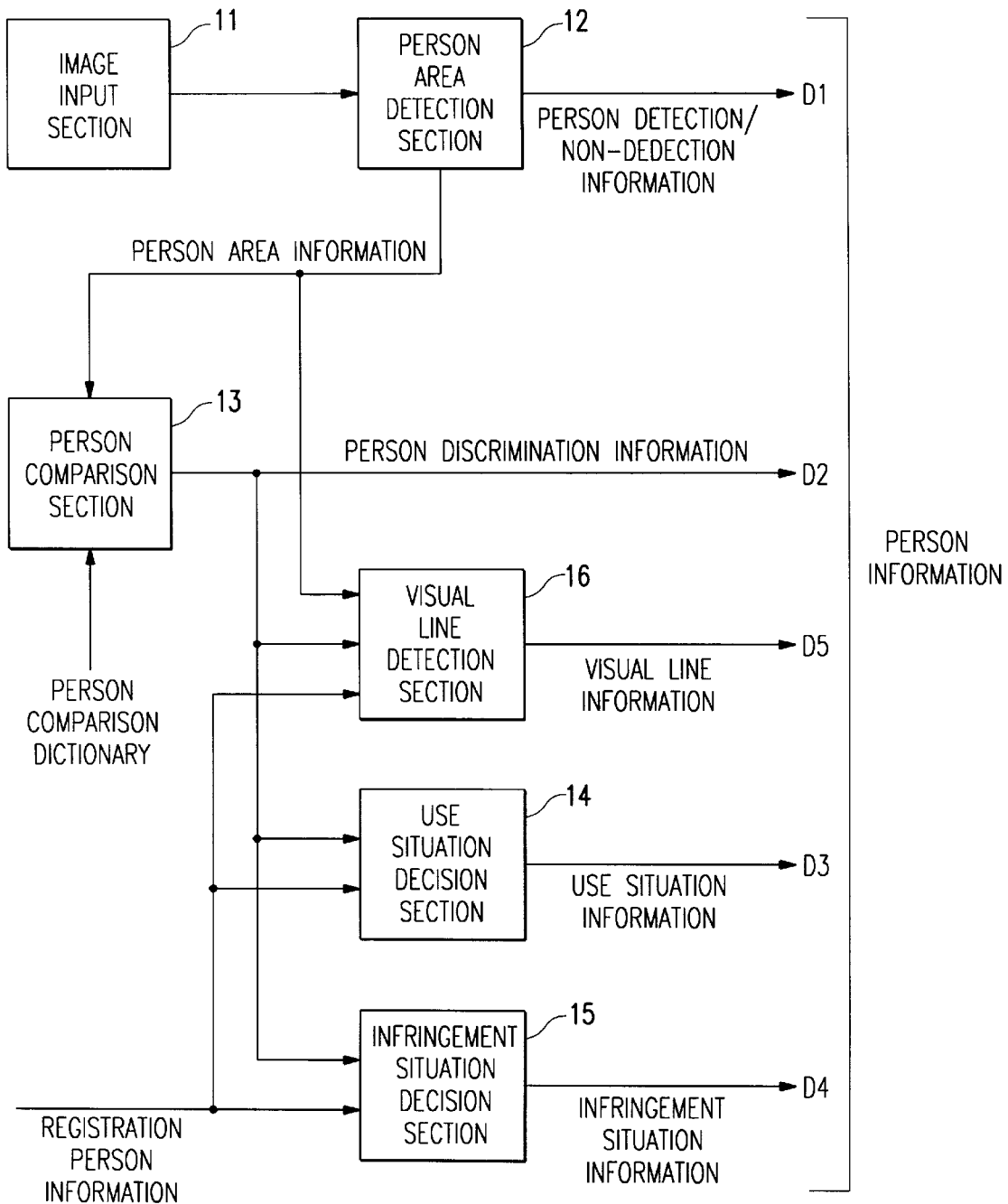
FIG. 11 is a block diagram of the sequrity apparatus according to a eighth embodiment of the present invention.

FIG. 11 is a block diagram of the situation detection section 1 according to the eighth embodiment. A visual line detection section 16 is an added section in comparison with FIG. 2. The visual line detection section 16 detects movement of the visual line of the user in case the user (registered) is included in the person discrimination information D2. For example, the face area of the user is extracted from the image and the eye area is extracted from the face area. The visual line is pursued according to the eye area. In this case, if a direction of the visual line is toward a predetermined area (visual area of the screen), an indication is outputted. If the direction of the visual line is not toward the predetermined area, another indication is outputted. These indications represent visual line information D5.

Figure 12:
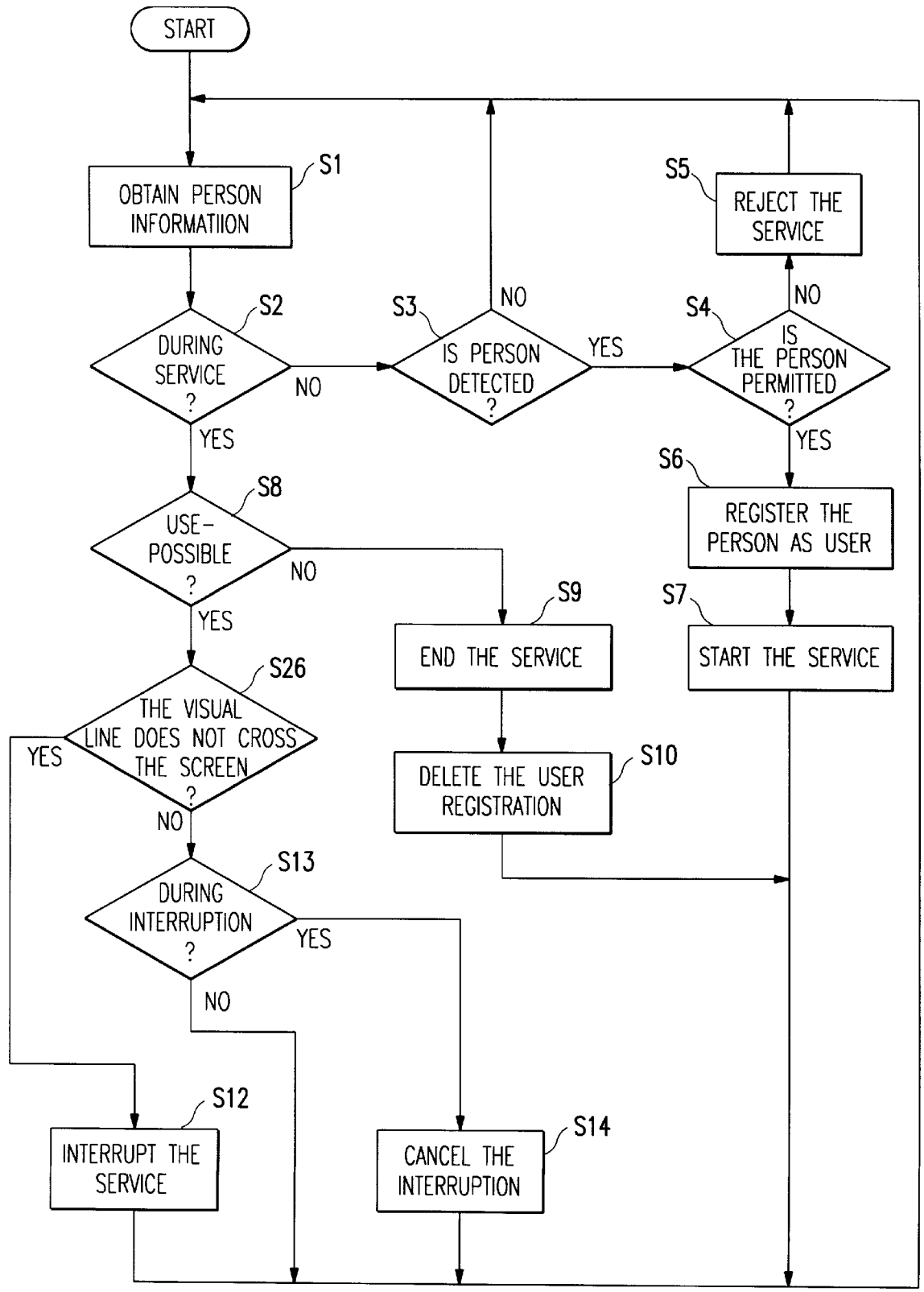
FIG. 12 is a flow chart of processing of the service supply permission section according to the eighth embodiment of the present invention.
Figure 13:
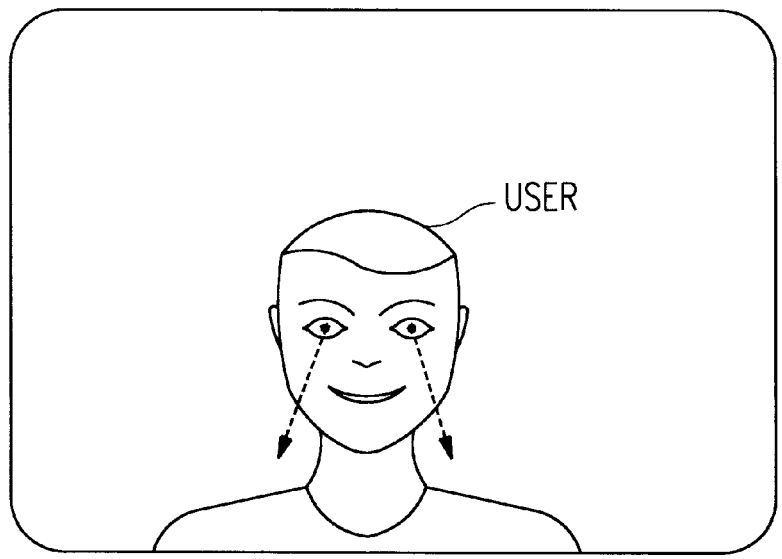
FIG. 13 is a schematic diagram of detection of visual lines of the user in the image according to the eighth embodiment of the present invention.

In this way, in the eighth embodiment, the visual line information D5 is outputted to the service supply permission section 2 as one of the person information. FIG. 12 is a flow chat of processing of the service supply permission section 2 according to the eighth embodiment. In FIG. 12, step S26 is added instead of step S11 in comparison with FIG. 3. During the supply of the service, assume that the situation detection section 1 detects that the user is under a situation to be supplied the service ("Yes" at step S8). In this case, the visual line detection section 16 keeps watch for the movement of the visual line of the user. If the direction of the visual line departs from the predetermined area of the display ("Yes" at step S26), the situation detection section 1 outputs the visual line information D5 to the service supply permission section 2. The service supply permission section 2 controls the service supply section 3 to interrupt the supply of the service (step S12). FIG. 13 is a schematic diagram of detection of the visual lines of the user in the image according to the eighth embodiment. As shown in FIG. 13, the visual lines of the user are detected from position of black eyes of the user's face in the image.

In this way, in the eighth embodiment, detection of the visual line of the user controls the supply of the service. Therefore, when another person walks behind the user, security of the survice is kept only if the visual line of the user departs from the display.

(h) Detection of visual line 2 (ninth embodiment)

In the eighth embodiment, a direction of the visual line of the user controls the supply of the service. However, if another person looks furtively at the display behind the user, the supply of the service can not be controlled. If the user turns his eyes away from the display whenever the other person walks behind the user, the supply of the service is interrupted to every time. Therefore, in the ninth embodiment, detection of the visual line of the non-user controls the supply of the service.

Figure 14:
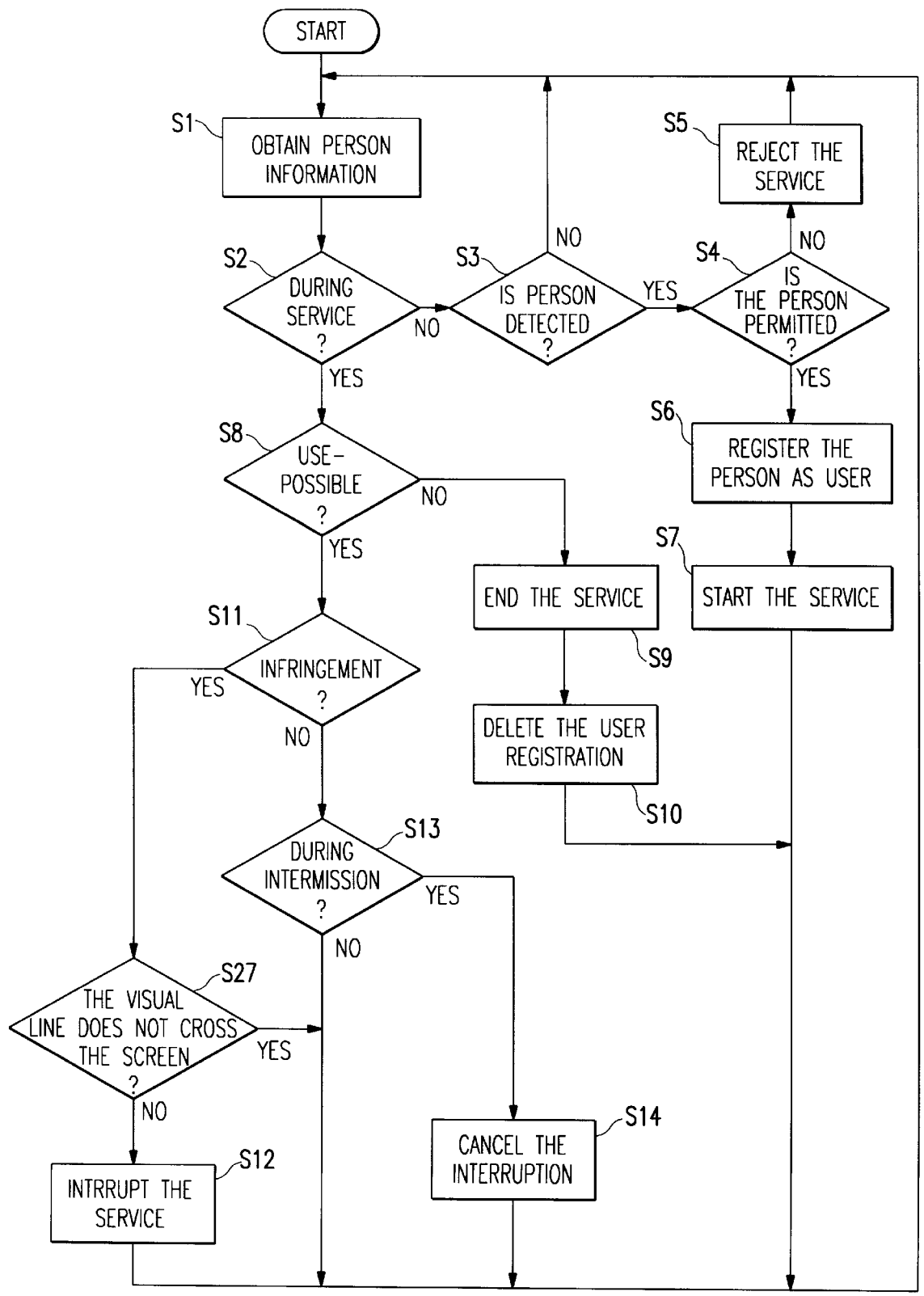
FIG. 14 is a flow chart of processing of the service supply permission section according to a ninth embodiment of the present invention.
Figure 15:
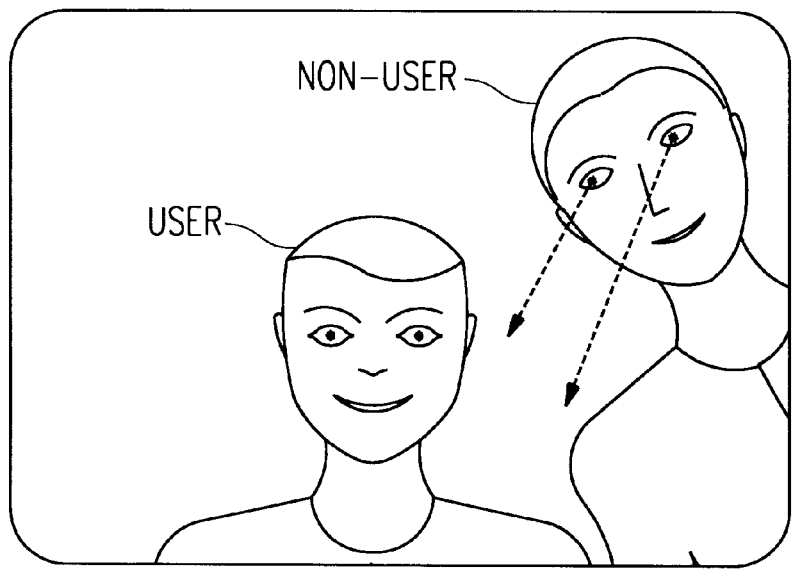
FIG. 15 is a schematic diagram of detection of visual lines of the non-user in the image according to the ninth embodiment of the present invention.

FIG. 14 is a flow chart of processing of the service supply permission section 2 according to the ninth embodiment. In FIG. 14, step S27 is added step between step S11 and step S12 in comparison with FIG. 3. In this case, the visual line detection section 16 detects the visual line of the non-user. In case the person is not discriminated by referring to the person discrimination information D2 (the person is decided to be a non-user), the movement of the visual line of the non-user is detected. In the same way as in the eighth embodiment, the face area is extracted from the image including the non-user and the eye area is extracted from the face area. The visual line of the eye area is pursued. If a direction of the visual line of the non-user points to a predetermined area (visible area of the display), an indication is outputted. If the direction of the visual line of the non-user does not point to the predetermined area, another indication is outputted. This purport is represented as the visual line information D5. During the supply of the service, assume that the situation detection section 1 detects that the non-user infringes the security of the non-user ("Yes" at step S11). In this case, the visual line detection section 16 keeps watch for the move of the visual line of the user. If the direction of the visual line of the non-user points to the predetermined area, for example, the non-user watches the display behind the user ("No" at step S27), the situation detection section 1 outputs the visual line information to the service supply permission section 2. The service supply permission section 2 controls the service supply section 3 to interrupt the supply of the service. FIG. 15 is a schematic diagram of detection of the visual lines of the non-user in the image according to the ninth embodiment. As shown in FIG. 15, the visual lines of the non-user are detected from position of black eyes of the non-user's face in the image.

In this way, in the ninth embodiment, the detection of the visual line of the non-user controls the supply of the service. Therefore, in case the non-user looks furtively at the display behind the user, the security of the service for the user is kept.

(i) Detection of visual line 3 (tenth embodiment)

Figure 16:
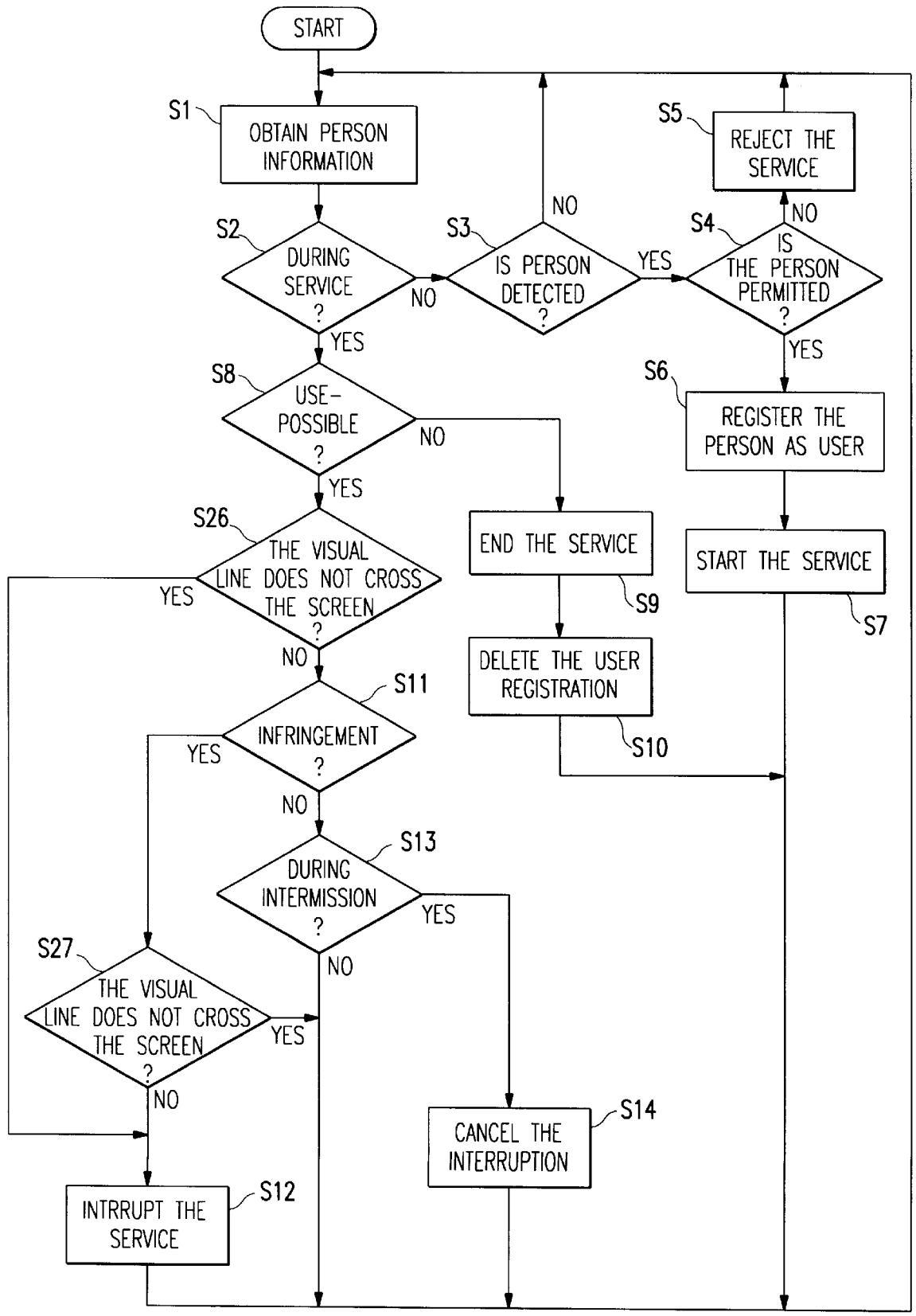
FIG. 16 is a flow chart of processing of the service supply permission section according to a tenth embodiment of the present invention.

In the tenth embodiment, detection of the visual line of the user and the non-user controls the supply of the service. FIG. 16 is a flow chart of processing of the service supply permission section 2 according to the tenth embodiment. In FIG. 16, step S26 and step S27 are added steps in comparison with FIG. 3. During the supply of the service, assume that the situation detection section 1 detects that the user is under a situation to be supplied the service ("Yes" at step S8). In this case, the visual line detection section 16 detects movement of the visual line of the user. If the visual line of the user departs from the predetermined area, for example, the user turns his eyes away from the display ("Yes" at step S26), the situation detection section 1 outputs the visual line information D5 to the service supply permission section 2. Then, the service supply permission section 2 controls the service supply section 3 to interrupt the supply of the service (step S12), On the other hand, assume that the direction of the user points to the predetermined area of the display (the user does not turn his eyes away from the display) ("No" at step S26) and the situation detection section 1 detects that the non-user infringes the service of the user ("Yes" at step S11). In this case, the visual line detection section 16 keeps watch for movement of the visual line of the non-user. If the direction of the visual line of the non-user points to the predetermined area of the display (the non-user watches the display behind the user) ("No" at step S27), the situation detection section 1 outputs the visual line information to the service supply permission section 2. The service supply permission section 2 controls the service supply section 3 to interrupt the supply of the service (step S12).

In this way, in the tenth embodiment, detection of the visual line of the user and the non-user controls the supply of the service. Therefore, the security of the service for the user is strengthened.

In the eighth, ninth, tenth embodiments, the visual line of the user or the non-user is detected. However, by detecting a direction of a face of the user or non-user, the supply of the service may be controlled. In this case, as for the user, if the direction of the user's face does not point to the display, the supply of the service is interrupted. As for the non-user, if the direction of the non-user's face points to the display, the supply of the service is interrupted. As for the method for detecting the direction of the face, the face area is extracted from the image including the user or the non-user. The direction of the face is pursued according to the face area.

In the above embodiments, the image is used for detecting the person information. However, sound or wireless may be used for detecting the person information. In case of the sound , the user is specified by the user's voice existing in the service-use area. If the user's voice is continuously detected, it is decided that the user is under a situation to be supplied the service. If a voice other than the user's is detected, it is decided that the security of the service of the user is infringed. In case of the wireless, the user is specified by detecting ID information of a wireless card. The user previously brings the wireless card with him. If the ID information of the user's wireless card is continuously detected, it is decided that the user is under a situation to be supplied the service. If ID information other than the user's wireless card is detected, it is decided that the sequrity of the service of the user is infringed.

Figure 17:
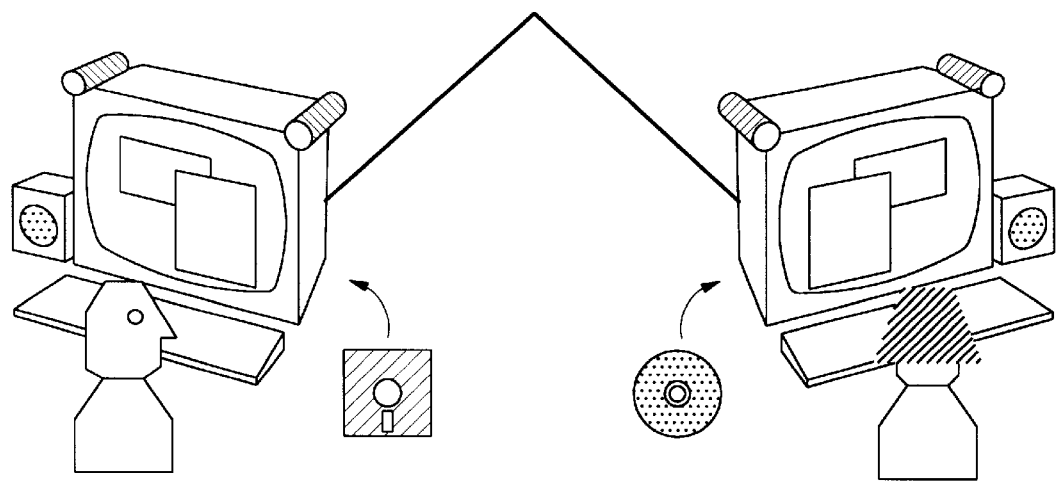
FIG. 17 is a schematic diagram of supply method for the security apparatus by software according to the present invention.

FIG. 17 is a schematic diagram showing a method of supplying a software for the present invention. A series of processings of the service supply permission section 2

(shown in FIGS. 3–6, 8–10, 12, 14, 16) and necessary information may be stored in a memory device as shown in FIG. 17. In this case, it is possible that the memory device is applied for each apparatus or content of the memory device is transmitted to each apparatus by a communication device.

A memory can be used to store instructions for performing the process described above, such a memory can be a CD-ROM, floppy disk, hard disk, magnetic tape, semiconductor memory, and so on.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A security apparatus for a device supplying a service to a user in a service use area surrounding the user, comprising:

image input means for continuously inputting an image to monitor the service use area;

person discrimination means for continuously recognizing a person in the input image, and for registering the person as a user allowed to use the service if the person is recognized as an authorized user;

use situation decision means for deciding that the user is not under a situation to use the service in case the user is not recognized in the input image;

infringement situation decision means for deciding that a security of the service use area is infringed in case at least one person other than the authorized user is recognized in the input image; and service control means for supplying the service to the authorized user and for controlling a supply of the service if said use situation decision means decides that the user is not under the situation to use the service or if said infringement situation decision means decides that the security of the service use area is infringed.

2. The security apparatus according to claim 1, wherein said service control means finishes the supply of the service in case said use situation decision means decides the user is not under the situation to use the service.

3. The security apparatus according to claim 1, wherein said service control means interrupts the supply of the service until the infringement situation is relieved in case said infringement situation decision means decides the security of the service is infringed.

4. The security apparatus according to claim 1, wherein said service control means decides whether work of the user for the service is completed or not in case said use situation decision means decides the user is not under the situation to use the service.

5. The security apparatus according to claim 4, wherein said service control means finishes the supply of the service in case the work of the user for the service is completed, interrupts the supply of the service in case the work of the user for the service is not completed, and relieves an interruption of the supply of the service in case said use situation decision means decides the user is under the situation to use the service again.

6. The security apparatus according to claim 1, wherein said person discrimination means recognizes the user by referring to a person comparison dictionary to recognize persons allowed to use the service.

7. The security apparatus according to claim 1, wherein said person discrimination means generates a person comparison dictionary to recognize unspecified users allowed to use the service, and recognizes the unspecified person by referring to the person comparison dictionary while the unspecified person is a user.

8. The security apparatus according to claim 1, wherein said service control means sends a warning to the user when said infringement situation decision means decides the security of the service is infringed.

9. The security apparatus according to claim 8, wherein said service control means controls the supply of the service in accordance with an indication of the user being warned.

10. The security apparatus according to claim 1, wherein said service control means controls the supply of the service in accordance with security degrees preset to a unit of the service or information for the service.

11. The security apparatus according to claim 1, wherein said service control means detects movement of the visual line or a direction of the face of the user and controls the supply of the service in accordance with the movement of the visual line or the direction of the face of the user.

12. The security apparatus according to claim 1, wherein said service control means detects movement of the visual line or a direction of the face of the non-user and controls the supply of the service in accordance with the movement of the visual line or the direction of the face of the non-user.

13. A security apparatus for a device supplying a service to a user, comprising:

person discrimination means for recognizing a user requesting the service;

use situation decision means for deciding whether the user is under a situation to use the service;

infringement situation decision means for detecting whether a non-user intrudes into a use area of the service to decide whether the service is infringed; and service control means for supplying the service to the user in case said person discrimination means recognizes the user, and for controlling a supply of the service if said use situation decision means decides the user is not under the situation to use the service or if said infringement situation decision means decides that the security of the service is infringed, wherein said service control means decides whether work of the user for the service is completed or not in case said use situation decision means decides the user is not under the situation to use the service, wherein said service control means finishes the supply of the service in case the work of the user for the service is completed, interrupts the supply of the service in case the work of the user for the service is not completed, and relieves an interruption of the supply of the service in case said use situation decision means decides the user is under the situation to use the service again, and wherein said service control means finishes the supply of the service in case said use situation decision means decides the user is not under the situation to use the service within a predetermined time during the interruption of the supply of the service.

14. A security apparatus for a device supplying a service to a user, comprising:

person discrimination means for recognizing a user requesting the service;

use situation decision means for deciding whether the user is under a situation to use the service;

infringement situation decision means for detecting whether a non-user intrudes into a use area of the service to decide whether the service is infringed; and service control means for supplying the service to the user in case said person discrimination means recognizes the user, and for controlling a supply of the service if said use situation decision means decides the user is not under the situation to use the service or if said infringement situation decision means decides that the security of the service is infringed, wherein said service control means sends a warning to the user when said infringement situation decision means decides the security of the service is infringed, wherein said service control means controls the supply of the service in accordance with an indication of the user being warned, and wherein said service control means controls the supply of the service in accordance with predetermined control information in case of a non-response of the user within a predetermined time after warning of the infringement.

15. A security method associated with supplying a service to a user in a service use area surrounding the user, comprising the steps of:

continuously inputting an image to monitor the service use area;

continuously recognizing a person in the input image;

registering the person as a user allowed to use the service if the person is recognized as an authorized user;

supplying the service to the authorized user;

deciding that the user is not under a situation to use the service in case the user is not recognized in the input image;

deciding that a security of the service use area is infringed in case at least one person other than the authorized user is recognized in the input image; and controlling the supply of the service if the user is not under the situation to use the service or if the security of the service use area is infringed.

16. A computer readable memory containing computer-readable instructions to supply a service to a user in a service use area surrounding the user, comprising:

instruction means for causing a computer to continuously input an image to monitor the service use area;

instruction means for causing a computer to continuously recognize a person in the input image;

instruction means for causing a computer to register the person as a user allowed to use the service if the person is recognized as an authorized user;

instruction means for causing a computer to supply the service to the authorized user;

instruction means for causing a computer to decide that the user is not under a situation to use the service in case the user is not recognized in the input image;

instruction means for causing a computer to decide that a security of the service use area is infringed in case at least one person other than the authorized user is recognized in the input image; and instruction means for causing a computer to control a supply of the service if the user is not under the situation to use the service or if the security of the service use area is infringed.

* * * * *